United States Patent [19]

Balachandran et al.

[11] Patent Number: 5,950,114
[45] Date of Patent: *Sep. 7, 1999

[54] APPARATUS AND METHOD FOR DERIVING A RANDOM REFERENCE NUMBER FROM PAGING AND ORIGINATING SIGNALS

[75] Inventors: Kumar Balachandran, Cary; Yi-Pin Eric Wang, Raleigh; Larry William Massingill, Selma, all of N.C.

[73] Assignee: Ericsson Inc., Research Triangle Park, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/623,873

[22] Filed: Mar. 29, 1996

[51] Int. Cl.$^6$ ........................................................ H04B 7/00
[52] U.S. Cl. ........................ 455/38.1; 455/411; 375/200; 340/825.44
[58] Field of Search .................................. 455/422, 31.3, 455/38.1, 517, 410, 411, 31.1, 31.2; 375/200; 340/825.44, 825.06, 825.34

[56] References Cited

U.S. PATENT DOCUMENTS

| | | |
|---|---|---|
| 5,077,830 | 12/1991 | Mallia ..................................... 455/38.1 |
| 5,091,942 | 2/1992 | Dent ........................................ 455/411 |
| 5,095,493 | 3/1992 | Arthur et al. ............................ 375/200 |
| 5,239,294 | 8/1993 | Flanders et al. ........................ 455/411 |
| 5,285,496 | 2/1994 | Frank et al. ............................ 455/31.2 |
| 5,390,252 | 2/1995 | Suzuki et al. ........................... 455/411 |
| 5,448,764 | 9/1995 | Sondermann et al. .................. 455/410 |

*Primary Examiner*—Reinhard J. Eisenzopf
*Assistant Examiner*—Sam Bhattacharya
*Attorney, Agent, or Firm*—Jenkens & Gilchrist, P.C.

[57] ABSTRACT

A method and associated apparatus for deriving a random reference value from a paging signal transmitted between a network station and a user terminal of a radiotelephonic communication system, such as a satellite-cellular communication system. When communication is to be initiated, a paging signal is transmitted by a network station to a user terminal. When the user terminal detects the paging signal, a random reference value is derived from a portion of the paging signal, and response signal, responsive to the random reference value is generated and transmitted to the network station. When the network station receives the response signal, it compares it to an expected response value to authenticate the user terminal.

19 Claims, 4 Drawing Sheets

APPARATUS AND METHOD FOR DERIVING A RANDOM REFERENCE NUMBER FROM PAGING AND ORIGINATING SIGNALS

FIELD OF THE INVENTION

The present invention relates generally to radiotelephonic communication systems such as a terrestrial-cellular communication system or a satellite-cellular communication system, and more particularly, to circuitry and an associated methodology for deriving a random reference number from a paging and originating communication signals used to authenticate communication between a base or network station and a mobile station. This authentication is required at the base station to uniquely identify a particular user replying on an acknowledgement channel as having been the one paged. Since users are spread geographically in the servicing area of the base station, acknowledgment by a user terminal to pages sent by the base station may not occur in the same logical sequence, hence the requirement for authentication.

BACKGROUND OF THE INVENTION

A communication system is formed, at a minimum, of a transmitter and a receiver interconnected by a communication channel. The communication system is operable at least to transmit communication signals, having an informational content, generated at, or applied to, the transmitter. The communication signals are transmitted to the receiver upon the communication channel. The receiver is operable to receive the transmitted, communication signal and to recreate the informational content of the communication signal.

A radio communication system is a communication system in which the communication channel is formed of one or more frequency bands of the electromagnetic frequency spectrum. A transmitter operable in a radio communication system generates a communication signal of characteristics permitting its transmission upon the communication channel, and the receiver operable in the radio communication system is operable to receive the communication signal transmitted upon the communication channel.

A radio communication system is advantageous for the reason that a fixed, or hard-wired, connection is not required to form the communication channel extending between a transmitter and a receiver. Communication can be effectuated between remotely-positioned transmitters and receivers without the need to form the hard-wired or other fixed connections therebetween.

A cellular communication system is a type of radio communication system. When the infrastructure, hereinafter referred to as the network, of the cellular communication system is installed in a geographical area, a subscriber to the cellular system is generally able to communicate telephonically in the system when positioned at any location in the geographical area encompassed by the system.

Cellular communication networks have been installed throughout significant portions of at least many of the world's population centers. Large numbers of subscribers to cellular communication systems formed of such cellular networks are able to communicate telephonically when positioned in areas encompassed by such cellular networks.

However, in some areas, terrestrial-cellular communication networks might not be installed or might not be commercially viable. For terrestrial-cellular communication networks which have already been installed, some may have been constructed pursuant to various different standards. A user terminal operable in one of the cellular communication systems may not be operable in others of the cellular communication systems.

Therefore, even in an area in which a cellular communication network has been installed, a user might not be able to communicate by way of the cellular communication network if the user attempts to utilize a user terminal constructed to be operable only with another one of the cellular communication networks.

Satellite-cellular communication systems have been proposed which, when implemented, shall permit a user, utilizing a user terminal operable therein, to communicate telephonically by way of the satellite-cellular communication system when positioned at almost any location. By transmitting down-link and up-link signals between a satellite-based transceiver and the user terminal, telephonic communication shall be possible between the user terminal and the satellite-based transceiver. By effectuating additional communication links between the satellite-based transceiver and a ground station, the user of the user terminal shall be able to communicate telephonically with another party by way of the ground station and the satellite-based transceiver.

In both satellite and terrestrial cellular communication systems, when a call is to be placed to a user terminal, a network station in a satellite-based system, or a base station in a terrestrial-cellular base system, transmits a paging signal to the user terminal. The paging signal includes the equipment identifier (EIN) of the user terminal and a random reference number.

Upon receipt of the paging signal, the user terminal sends to the base/network station a response signal base upon the random reference number. In a similar manner, the base/network station forms the same response signal and compares it to the user terminal response signal. These signals must substantially correlate in order for the base/network station to uniquely identify or authenticate the user terminal. Similarly, in both satellite and terrestrial cellular communication systems, when a user terminal is originating a call, an access request signal is sent to the base/network station from the user terminal. Typically the access request signal includes a call establish cause, the dial number information, and a random reference number.

Upon receipt of the access request signal, the base/network station sends to the user terminal a response signal based upon the random reference number. The user terminal forms the same response signal and compares it to the base/network station response signal. These signals must substantially correlate for call establishment to proceed.

Because communication systems are being developed in manners which attempt to minimize the bandwidth required to communicate between the base/network station and the user terminal, the available bandwidth for communication between the base/network station and the user terminal on the forward as well as the reverse channels is often limited.

When the paging data or the access request data being transmitted exceeds the available limited bandwidth, the limited bandwidth may prevent adequate paging communication or access request communication between the user terminal and the base/network station, thereby hindering proper communication.

Another problem encountered with the access request signal occurs as discussed above, the access request signal transmitted by the user terminal to the base/network station when originating a call typically includes a call establishment cause, the dial number information, and a random reference number. The number of bits of information used for the random reference number varies from two to five bits.

Typically five bits are used for random reference for the calls that occur most frequently or are of high priority, such as originating calls or emergency calls. Five bits are used to reduce the probability that two phones have an identical random reference number. In contrast two bits are typically used for the types of call which occur least frequently.

For the above mentioned problems, what is needed therefor, is a manner by which to reduce the size of the paging and access request signals to be transmitted between a base/network station and a user terminal to ensure that the signals will fit a limited bandwidth. What is also needed, is an access request signal of a fixed length or fixed format.

It is in light of this background information related to communications pursuant to a radio-telephonic communication system, such as a satellite-based or terrestrial-based cellular communication system, that the present invention has been developed.

SUMMARY OF THE INVENTION

The present invention overcomes the above identified problems as well as other shortcomings and deficiencies of existing technologies by providing an apparatus and a method for deriving a random reference number for use in a authentication response signal from portions of a paging or access request signal and by optimizing the bandwidth requirement on the channel.

In an embodiment of the present invention, there is no requirement that the random reference number be sent as an additional set of bits of the paging signal or of the access request signal.

Transmission of paging signals and access request signals from which are derived response signals to authenticate a user terminal and network station are minimized.

A paging signal is transmitted by a network station to page a user terminal to initiate an incoming call. When the user terminal receives the paging signal, a random reference number is derived from a portion of the paging signal. A response signal which is responsive to the random reference number is then transmitted back to the network station.

When the network station receives the response signal, a comparison is made with an expected response signal, and if a certain degree of correlation exists between the response signal and the expected signal, authentication is determined, and communication continues.

A fixed length access request signal is transmitted by a user station to a network station to originate a call. When the network station receives the access request signal, a random reference number is derived from a portion of the access request signal. A response signal which is responsive to the random reference number and is then transmitted back to the user terminal.

When the user terminal receives the response signal, a comparison is made with an expected response signal, and if a certain degree of correlation exists between the response signal and the expected signal, authentication is determined, and communication continues.

BRIEF DESCRIPTION OF THE DRAWINGS

A more complete understanding of the method and apparatus of the present invention may be had by reference to the following Detailed Description when taken in conjunction with the accompanying Drawings wherein.

DETAILED DESCRIPTION

Figure 1:
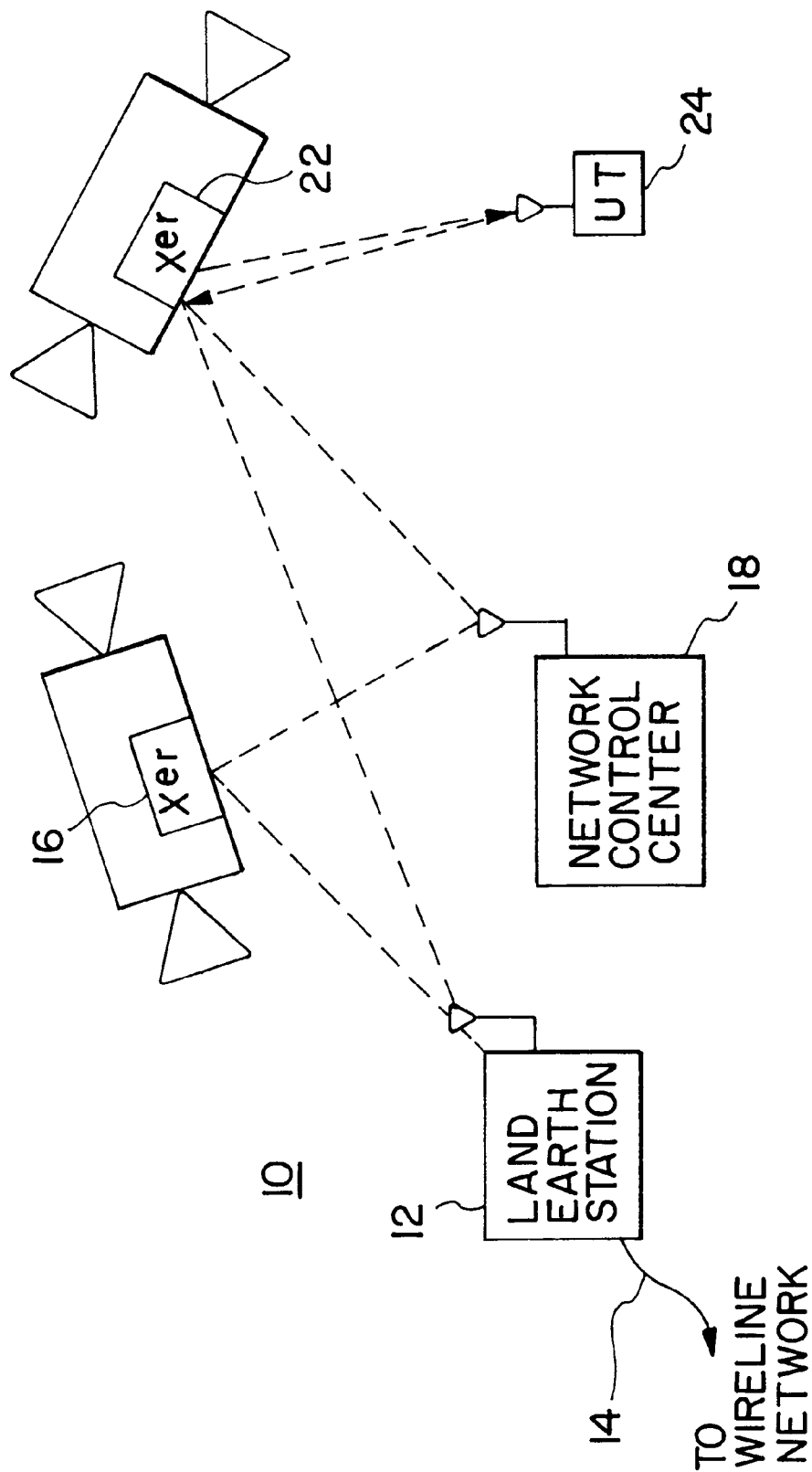
FIG. 1 is a block diagram illustrating a satellite-cellular communication system which embodies the circuitry and method of an embodiment of the present invention.

Referring first to FIG. 1, a satellite-cellular communication system, shown generally at 10, includes the circuitry, and associated methodology, of an embodiment of the present invention. It should be noted at the outset that, while the communication system 10 is illustrated to be a satellite-cellular communication system, it is contemplated that the present invention can analogously be embodied in other communications systems such as a terrestrial-cellular, or other radiotelephonic communication system. For instance, as one skilled in the art shall appreciate, by appropriate substitution of terrestrial-based base stations for certain of the satellite-based transceivers of a satellite-cellular communication system, a terrestrial-cellular communication system can instead be formed.

The communication system 10 includes a land Earth station 12 which is coupled, here represented by line 14, to a wireline telephonic network. The land Earth station 12 includes transceiver circuitry for transceiving communication signals, inter alia, with a satellite-based transceiver 16.

The satellite-based transceiver 16 is operable to transceive communication signals not only with the land Earth station 12 but also with other land-based devices, such as transceiver circuitry of a network control center 18. The transceiver 16 is primarily operable as a relay to relay signals generated at the land Earth station 12 to the network control center 18 and vice-versa. The transceiver is preferably able to receive signals on any frequency channel and relay the signal on another frequency channel.

The transceiver circuitry of the network control center 18, in turn, is able to transceive communication signals with other satellite-based transceivers, such as the transceiver 22. The transceiver 22, similar to the transceiver 16, is able to transceive communication signals with land-based transceivers including, for example, a user terminal 24. The transceiver circuitry of devices 12, 16, 18 and 22 each include a plurality of transceiving elements to permit concurrent communication between large numbers of communication stations.

Communication pursuant to a satellite-cellular communication system, such as the system 10 shown in FIG. 1, permits a user of a user terminal, such as user terminal 24, to communicate telephonically when positioned at any location throughout large areas of the world.

As long as the user of the user terminal 24 is positioned to permit transmission and reception of communication signals with a satellite-based transceiver, such as one of the transceivers 16 and 22, the user is able to communicate telephonically with a user of another user terminal or to a telephonic device of a conventional, wireline network.

Because of the almost-worldwide scope permitted of a satellite-cellular communication system, the user of the user terminal 24 need not be concerned with the compatibility of the user terminal with a local, 14 cellular system. The user is further capable of communicating telephonically in an area which does not otherwise have an installed cellular, or wireline, telephonic network.

For instance, when the land Earth station 12 (i.e., a telephone device coupled thereto) initiates a call to the user terminal 24, an indication of the initiation is provided to the network control center 18 by way of the transceiver 16. The network control center generates control signals, including paging signals, which are provided to the terminal 24 by way of the transceiver 22. Once call set-up is successfully completed, voice channels between the land Earth station and the user terminal are defined to permit two-way communication between the land Earth station and the user terminal, by way of the transceiver 22.

The general operation of system 10 will now be described. When a call is to be placed to a user terminal, supervisory and control signals must first be sent to the user terminal. Such signals are transmitted, for example, to inform the user terminal of the incoming call and to cause the user terminal to be tuned to transceive communication signals pursuant to such call. The supervisory and control signals transmitted to the user terminal includes a paging signal to alert the user terminal of the incoming call. After receiving a request from the LES, the network control center initiates the transmission of the paging signal which is transmitted to the transceiver 22 and, in turn to the user terminal 24.

Figure 4:
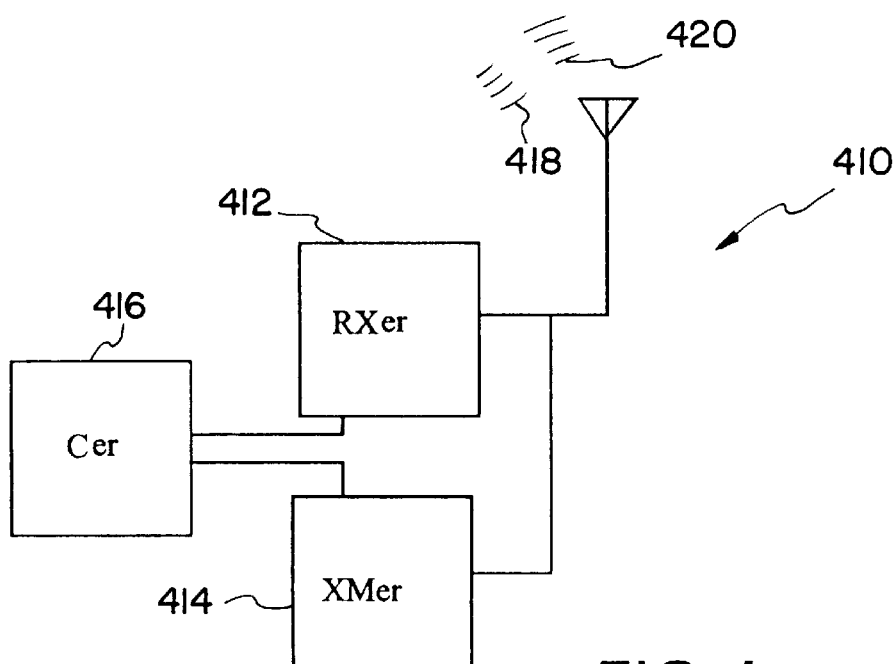
FIG. 4 is a diagram illustrating in greater detail portions of the communication system shown in FIG. 1.

The network control center 18 includes transceiver circuitry as similarly shown in FIG. 4, and includes a transmitter 414, receiver 412, each of which are coupled to a controller 416. The controller 416 is operable to form and cause transmission of the paging signal by the transmitter 414 to the transceiver 22.

Once the paging signal generated by the network control center 18 is received by transceiver 22, transceiver 22 transmits the paging signal to the user terminal 24.

If the user terminal 24 detects the paging signal transmitted thereto, the terminal 24 generates and transmits a response signal back to the transceiver 22. Transceiver 22 then transmits the response signal to the network control center 18 to be received by the receiver thereof.

The controller of network control center 18, determines whether the received signal compares with an expected response signal. If so, the user terminal 24 is authenticated and the call placement to user terminal 24 is permitted to continue.

Similarly, when a call is originating from user terminal 24, user terminal 24 initiates transmission of an access request signal which is transmitted to the transceiver 22 and, in turn to the network control center 18.

If the network control center 18 detects the access request signal transmitted thereto, network control center 18 generates an response signal for transmission back transceiver 22. Transceiver 22 then transmits the response signal to the user terminal 24.

The user terminal 24, determines whether the received signal compares with an expected response signal. If so, the user terminal 24 is authenticated and the call originating from user terminal 24 is permitted to continue.

Figure 2:
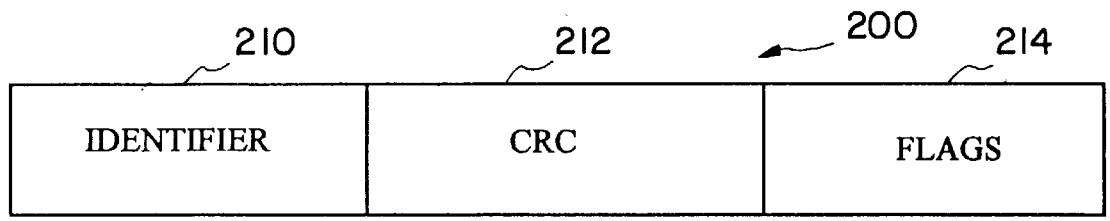
FIG. 2 is a diagram illustrating information contained in a paging signal utilized during operation of an embodiment of the present invention.

Referring now to FIG. 2, there is depicted a block diagram 200 an example of information contained in a paging signal as utilized by the present invention. As discussed above, the paging signal is transmitted during operation of the communication system 10 to page a user terminal.

The paging signal illustrated in diagram 200 includes a user terminal identifier code 210. The identifier code is of a value which uniquely identifies a user terminal, such as the user terminal 24 shown in FIG. 1. The identifier 210 may be formed of a temporary mobile subscriber identity (TMSI) value or an international mobile subscriber identity (IMSI) value as defined in an ASEAN (the association of southeastern Asian nations) Cellular Satellite (ACES) system. However, it is contemplated to be within the scope of this invention that other types of identifiers could be used herein. When a user terminal receives a paging signal, the value of the identifier 210 identifies the user terminal which is being paged.

The paging signal illustrated in diagram 200 further includes coding bits 212, here cyclic redundancy code (CRC) bits, which are conventional in nature. The paging signal further includes flag bits 214 which are utilized for other purposes. A random reference number, which, in the past, was used to generate the response signal, is not included in the paging signal nor transmitted by the base or network stations. Rather, in the present invention the random reference value needed to form the proper response signal for the proper user terminal is derived from the identifier 210 of the paging signal.

An algorithm known to both the base or network station and the user terminal is established to derive the random reference number from the identifier 210. For example, if the identifier is a seven bit number, the algorithm may be to take the 1, 4, 6 and 7 bits and transmits these values back to the base or network station. Another example, would include taking a select number of bits from the identifier number and generating a random reference number using these bits in a predetermined function, thereby computing a CRC and transmitting the generated parity bits.

The base or network station, using the same algorithm as the proper user terminal, derives the expected random reference value and compares the expected random reference value that with the random reference number transmitted from the user terminal. If the two substantially compare, authentication is achieved and communication continues. This will be described in more detail below in reference to FIG. 5.

Figure 3:
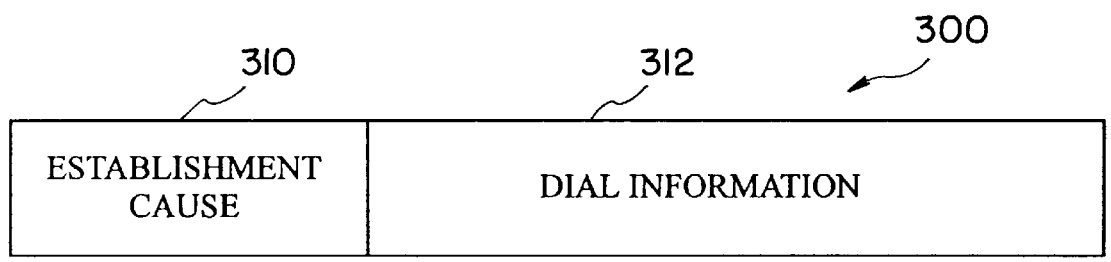
FIG. 3 is a diagram illustrating information contained in an access request signal utilized during operating of an embodiment of the present invention.

Referring now to FIG. 3, there is depicted a block diagram 300 illustrating an example of information contained in an access request signal as utilized by the present invention in an ACeS system. As discussed above, when a user terminal is originating a call, the access request signal is transmitted from a user terminal to a base or network station.

The access request signal illustrated in diagram 300 includes call establishment cause information 310 and dial information 312. Although not shown, it is contemplated that the access request signal could also include CRC and flag information as similarly shown in FIG. 2.

Typically call establishment cause information 310 is used to identify the type of call being originated, such as an emergency call. Therefore the number of bits reserved for this will depend upon the number of call establishments being utilized. For example if there are up to 16 types of call establishment, 4 bits would be sufficient. Other call types are known to those skilled in the art.

The dial information 312 is typically compressed digital bits of information representing the dial number of the called party. A random reference number, which, in the past, was used by the base or network station to generate the response signal, is not included in the call access signal nor transmitted at another time by the user terminal. Rather, in the present invention the random reference number needed by the base or network station to form the proper response signal to be transmitted to the user terminal is derived from the dial information 312 of the call access signal.

As similarly described with the paging signal above, an algorithm known to both the user terminal and the base or network station is established to derive the random reference number from the dial information. For example, if dial information comprises 24 binary bits, the algorithm may be to take the 11, 14, 16 and 21 bits and transmit these values back to the user terminal. Another example, would include taking a select number of bits from the dial information and generating a random reference number using these bits in a predetermined function.

The user terminal, using the same algorithm as the base or network station, derives the expected random reference value and compares the expected random reference value that with the random reference number transmitted from the base or network stating. If the two substantially compare, authentication is achieved and communication continues. This will be described in more detail below in reference to FIG. 6.

Referring now to FIG. 4, there is shown a more detailed diagram of a communication station 410, such as network control center 18 or user terminal 24 as are similarly shown in FIG. 1. As depicted, communication station 410 includes a receiver 412 and a transmitter 414, both of which are coupled to a controller 416 which controls the operation of receiver 412 and transmitter 414.

With reference to communication station 410 as user terminal 24, when a call is being placed to user terminal 24, receiver 412 is operable to receive a signal 418, such as a paging signal transmitted to the user terminal 24 from network control center 18. Once received, the signal is demodulated, decoded, and descrambled, as necessary. A random reference number is then derived from a portion of the paging signal.

Responsive to the value of the random reference number, the controller 416 causes the transmitter 414 to transmit a response signal, and as described above, when the response signal is received by the network control center 18, it is compared to an expected response for authentication.

When user terminal 24 is originating a call, controller 416 causes the transmitter 414 to transmit a call access request signal. And as described above, the call access signal is received by the network control center 18. A response signal is then sent back to user terminal 24 for authentication.

Figure 5:
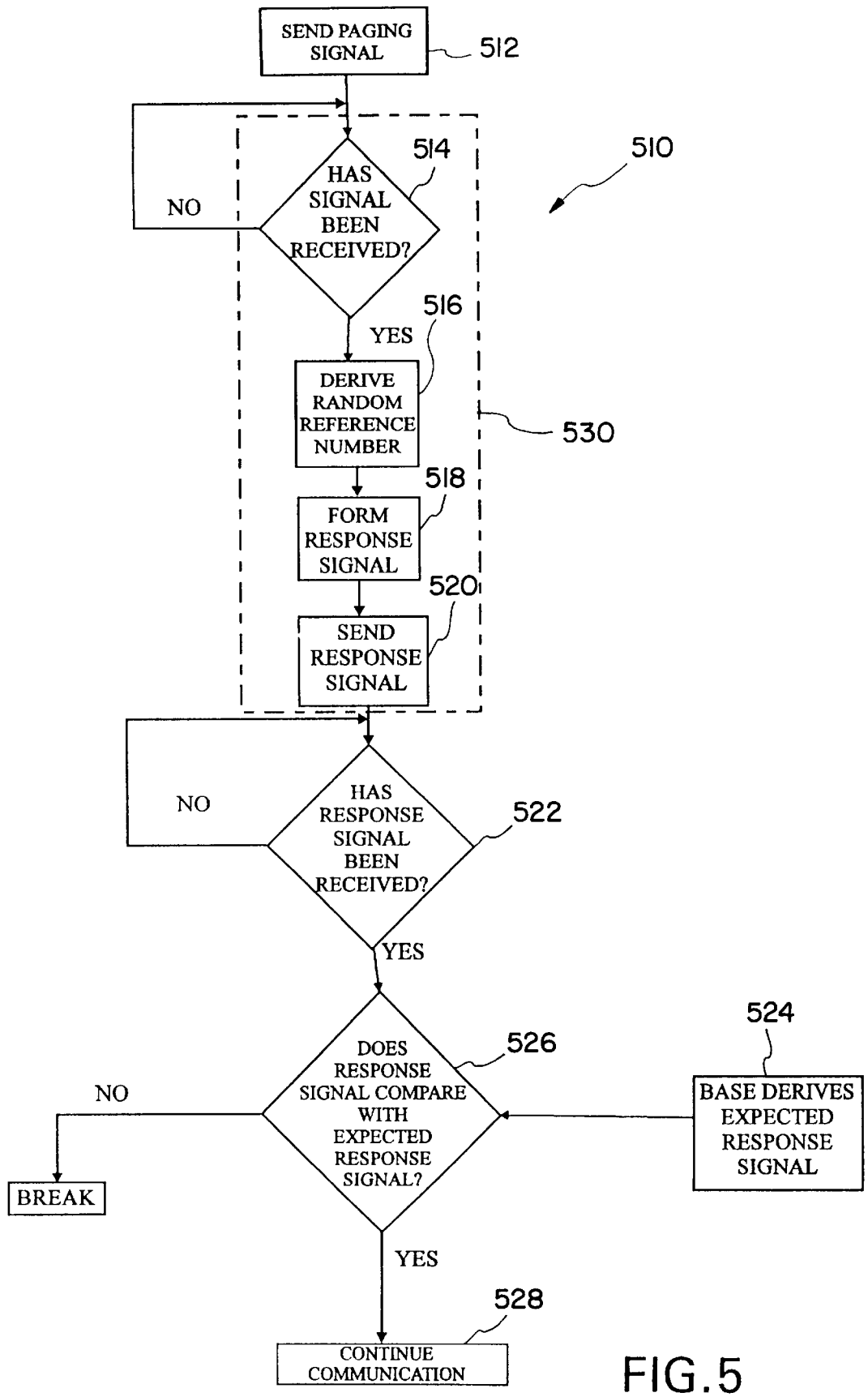
FIG. 5 is a flow diagram illustrating the method steps of a first method of operation of an embodiment of the present invention.

Referring now to FIG. 5, there is shown a flow diagram 510 depicting a method of an embodiment of the present invention utilizing a paging signal from a network control center in a communication system as similarly shown in FIG. 1. First, as indicated by block 512, a paging signal is transmitted. Then, as indicated by decision block 514, a determination is made as to whether the paging signal has been received. If not, the no branch is taken allowing decision block 514 to be repeated.

If a determination is made at the decision block 514 that a paging signal has been received, the yes branch is taken to block 516 and the random reference number is derived from a portion of the paging signal.

Thereafter, and as indicated by block 518, a response signal is formed which is responsive to the random reference number. Once the response signal is formed, the response signal is transmitted as indicated by block 520.

As indicated by block 524, an expected response signal is derived from the original paging signal.

Thereafter, as indicated by decision block 522, a determination is made as to whether the response signal has been received. If not, the no branch is taken allowing decision block 522 to be repeated.

If a determination is made as to whether the response signal has been received, the yes branch is taken to decision block 526, and a determination is made as to whether the received response signal compares with the expected response signal. If not, the no branch is taken and communication is not allowed to continue. If the received response signal is determined to compare with the expected response signal, the yes branch is taken to block 528, and communication is permitted to continue.

Block 530 encompasses blocks 514, 516, 518 and 520, and depicts those method steps performed at the user terminal 24, while the blocks outside of block 530 occur at the network control center 18.

Figure 6:
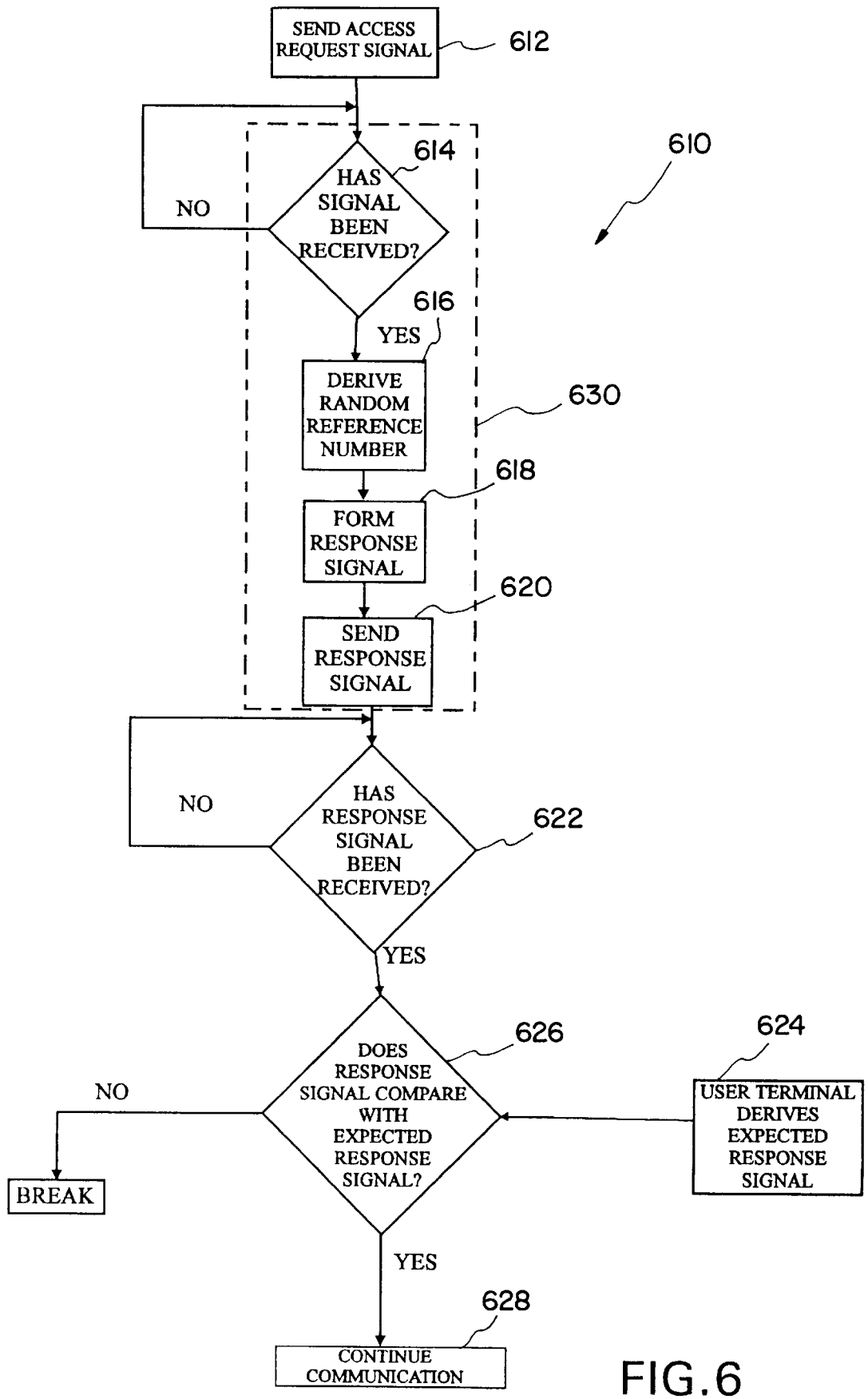
FIG. 6 is a flow diagram illustrating the method steps of a second method of operation of an embodiment of the present invention.

Referring now to FIG. 6, there is shown a flow diagram 610 depicting a method of an embodiment of the present invention utilizing an access request signal transmitted by a user terminal in a communication system as similarly shown in FIG. 1. First, as indicated by block 612, access request signal is transmitted. Then, as indicated by decision block 614, a determination is made as to whether the access request signal has been received. If not, the no branch is taken allowing decision block 614 to be repeated.

If a determination is made at the decision block 614 that an access request signal has been received, the yes branch is taken to block 616 and a random reference number is derived from a portion of the access request signal.

Thereafter, and as indicated by block 618, a response signal is formed which is responsive to the random reference number. Once the response signal is formed, the response signal is transmitted as indicated by block 620.

As indicated by block 624, an expected response signal is derived at the user terminal from the access request signal.

Thereafter, as indicated by decision block 622, a determination is made as to whether the response signal has been received. If not, the no branch is taken allowing decision block 622 to be repeated.

If a determination is made as to whether the response signal has been received, the yes branch is taken to decision block 626, and a determination is made as to whether the received response signal compares with the expected response signal. If not, the no branch is taken and communication is not allowed to continue. If the received response signal is determined to compare with the expected response signal, the yes branch is taken to block 628, and communication is permitted to continue.

Block 630 encompasses blocks 614, 616, 618 and 620 and depicts the method steps performed by the network control center 18, while the blocks outside of block 630 occur at the user terminal 24.

An essential difference of the methods depicted in FIGS. 5 and 6 in relation to known communication methods, is that the random reference number used in the forming of the authentication response signals is not sent with the paging signal or the access request signal, rather it is derived from these signals.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for deriving a random reference value in a communication system having at least a first radio communication station and a second radio communication station, said method comprising the steps of:

transmitting a non-encoded paging signal from the first radio communication station to the second radio communication station, at least a portion of the paging signal including identity information identifying the second radio communication station; and deriving at the second radio communication station the random reference value from the values of the identity information forming a portion of the paging signal transmitted during said step of transmitting thereby reducing the size of the paging signal.

2. The method as recited in claim 1, further comprising the steps of:

generating a response signal at the second radio communication station, the response signal of values responsive to the random reference value derived during said step of deriving the random reference value; and transmitting the response signal from the second radio communication station to the first radio communication station.

3. The method as recited in claim 2, further comprising the steps of:

comparing the values of the response signal received at the first radio communication station with calculated expected values; and permitting continued communication between the first radio communication station and the second radio communication station if the calculated expected values substantially correlate to the values of the response signal.

4. The method as recited in claim 1, wherein:

the paging signal comprises a digitally-encoded signal and wherein the identity information is embodied therein.

5. The method as recited in claim 4, wherein:

the step of deriving the random reference value includes the step of extracting at least a portion of the identity information from the paging signal.

6. The method as recited in claim 5, wherein:

the random reference value is equal to the value of the extracted portions of the identity information.

7. The method as recited in claim 5, wherein:

the random reference value comprises a function of the value of the extracted portions of the identity information.

8. A method for deriving a random reference value in a communication system having at least a first radio communication station and a second radio communication station, said method comprising the steps of:

transmitting a non-encoded access signal from the first radio communication station to the second radio communication station, at least a portion of the access signal including dial number information identifying the dial number of a party being called; and deriving at the second radio communication station the random reference value from the values of the dial number information forming a portion of the access signal transmitted during said step of transmitting thereby reducing the size of the access signal.

9. The method as recited in claim 8, further comprising the steps of:

generating a response signal at the second radio communication station, the response signal having values responsive to the random reference value derived during said step of deriving the random reference value; and transmitting the response signal from the second radio communication station to the first radio communication station.

10. The method as recited in claim 9, further comprising the steps of:

comparing the values of the response signal received at the first radio communication station with calculated expected values; and permitting continued communication between the first radio communication station and the second radio communication station if the calculated expected values substantially correlate to the values of the response signal.

11. The method as recited in claim 8, wherein:

the access signal comprises a digitally-encoded signal and wherein the dial number information is embodied therein.

12. The method as recited in claim 11, wherein:

the step of deriving the random reference value includes the step of extracting at least a portion of the dial number information from the access signal.

13. The method as recited in claim 12, wherein:

the random reference value is equal to the value of the extracted portions of the dial number information.

14. The method as recited in claim 12, wherein:

the random reference value comprises a function of the value of the extracted portions of the dial number information.

15. The method as recited in claim 8, wherein:

the access signal comprises a digitally-encoded signal and wherein the dial number information comprises a fixed number of one-bit coded portions thereof.

16. A method for deriving a random reference value in a communication system between a base station and a mobile station, said method comprising the steps of:

transmitting a non-encoded paging signal from the base station to the mobile station, at least a portion of the paging signal including identity information identifying the mobile station;

deriving at the mobile station the authentication reference value from the values of the identity information forming a portion of the paging signal transmitted during said step of transmitting; and generating a response signal at the mobile station, the response signal of values responsive to the random reference value derived during said step of deriving the authentication reference value thereby reducing the size of the paging signal.

17. The method as recited in claim 16, wherein:

the paging signal comprises a digitally-encoded signal and wherein the identity information is embodied therein.

18. An apparatus for deriving a random reference value in a communication system having at least a first radio communication station and a second radio communication station, said apparatus comprising:

means for transmitting a non-encoded paging signal from the first radio communication station to the second radio communication station, at least a portion of said paging signal including identity information identifying the second radio communication station; and means at the second radio communication station for deriving said random reference value from the values of said identity information thereby reducing the size of the paging signal.

19. An apparatus for deriving a random reference value in a communication system having at least a first radio communication station and a second radio communication station, said apparatus comprising:

means for transmitting a non-encoded access signal from the first radio communication station to the second radio communication station, at least a portion of said access signal including dial number information identifying the dial number of a party being called; and means at the second radio communication station for deriving said random reference value from the values of said dial number information thereby reducing the size of the access signal.

* * * * *

UNITED STATES PATENT AND TRADEMARK OFFICE
CERTIFICATE OF CORRECTION

PATENT NO. : 5,950,114  
DATED : September 7, 1999  
INVENTOR(S) : Balachandran et al.

Page 1 of 1

It is certified that error appears in the above-identified patent and that said Letters Patent is hereby corrected as shown below:

<u>Column 5,</u>
Line 7, delete "14"

Signed and Sealed this

Thirtieth Day of April, 2002

Attest:

JAMES E. ROGAN
*Attesting Officer*    *Director of the United States Patent and Trademark Office*